July 24, 1928.

B. BERGMAN 1,678,495

DIRIGIBLE HEADLIGHT

Filed Sept. 17, 1927   3 Sheets-Sheet 2

INVENTOR
BERNARD BERGMAN
BY
ATTORNEYS

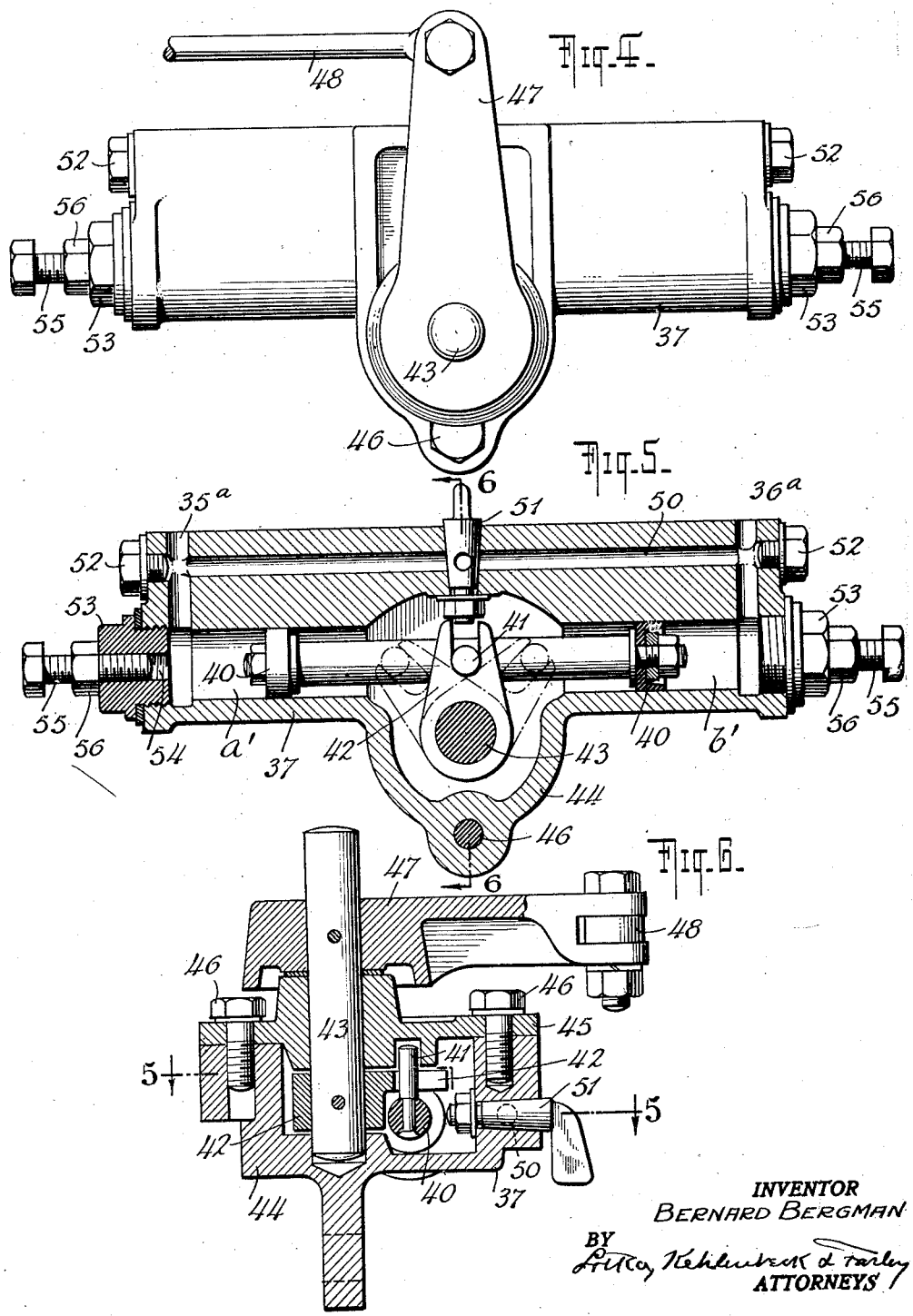

Patented July 24, 1928.

1,678,495

UNITED STATES PATENT OFFICE.

BERNARD BERGMAN, OF NEW YORK, N. Y.

DIRIGIBLE HEADLIGHT.

Application filed September 17, 1927. Serial No. 220,085.

My invention relates to headlights and more particularly to dirigible headlights for automobiles and other self-propelled vehicles and has for its object to provide a novel and efficient mechanism for pivotally adjusting the headlights coincidentally and in accordance with the operation of the steering wheel to change the direction of travel of the vehicle. Other more specific objects will appear from the description hereinafter and the features of novelty will be pointed out in the claims.

Figure 1:
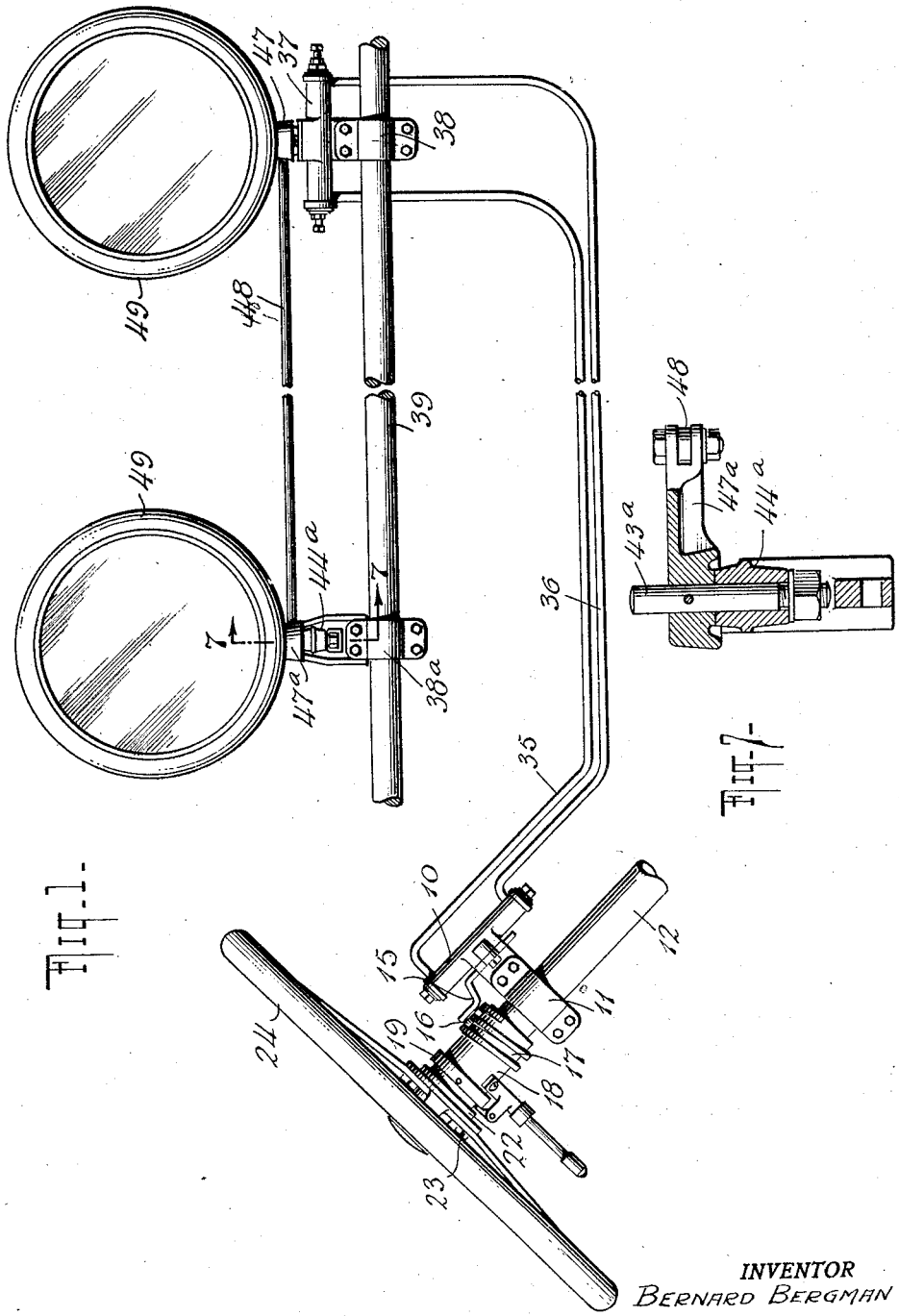
Figure 2:
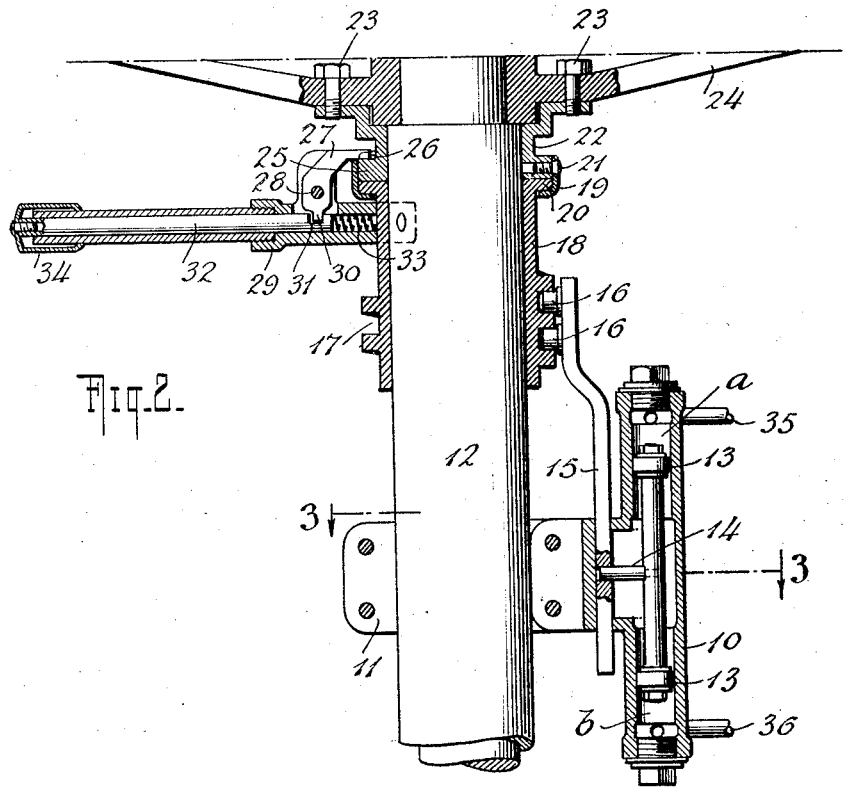
Figure 3:
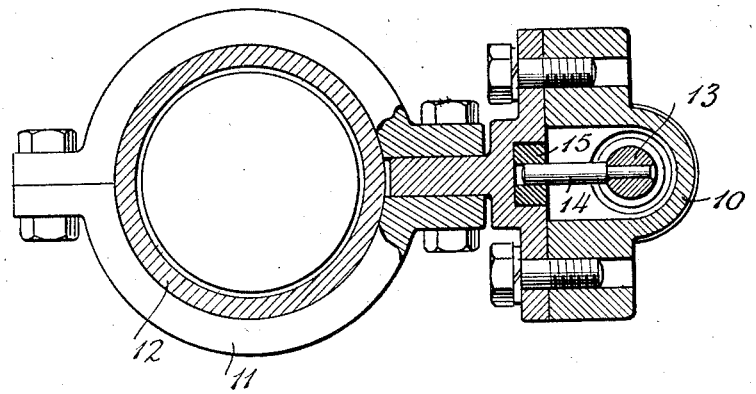

In the accompanying drawings, which illustrate an example of the invention without defining its limits, Fig. 1 is a diagrammatic view illustrating the novel arrangement in a form designed particularly for automobiles; Fig. 2 is a fragmentary elevation, with parts in section, of the steering means of an automobile equipped with the invention; Fig. 3 is a section on the line 3—3 of Fig. 2; Fig. 4 is a plan view of the headlight adjusting means forming part of the novel arrangement; Fig. 5 is a horizontal section thereof on the line 5—5 of Fig. 6; Fig. 6 is a cross-section on the line 6—6 of Fig. 5; and Fig. 7 is a detail section on the line 7—7 of Fig. 1.

In the form illustrated in the drawings, a control cylinder 10 is mounted, by means of a bracket 11 or other suitable fastening device, upon the fixed steering post 12 of an automobile or other automotive vehicle, and contains a double ended control piston 13. The latter is suitably connected, for instance, by means of a pin 14 with an operating member 15 which is mounted to slide in the bracket 11 in directions to cause the piston 13 to be reciprocated in the cylinder 10, as will be more fully described hereinafter. The member 15 carries one or more rollers 16 extending into a helical cam groove 17 forming part of a sleeve 18 rotatably mounted upon the post 12, as shown in Figs. 1 and 2. The sleeve 18 is held against movement lengthwise of the post 12 in any convenient manner as by means of a ring 19 having an inturned annular flange projecting beneath an annular outwardly projecting flange 20 formed at the one end of the sleeve 18, as shown in Fig. 2. The ring 19 is secured by means of screws 21 to a collar 22 mounted in axial juxtaposition to the sleeve 18 and connected by bolts or the like 23 with the customary steering wheel 24 to partake of the operative movements developed therein in guiding the vehicle over its intended path of travel. The sleeve 18 and collar 22 are independent elements capable of independent rotative movements relatively to the post 12 and normally are coupled together in the following manner. The collar 22 is provided with an outwardly projecting annular flange 25, preferably located in surface engagement with the flange 20 of the sleeve 18, and including a recess or notch 26 for the accommodation of a locking pawl 27, as shown in Fig. 2. The locking pawl 27 is pivoted at 28 upon a tube 29 which is fixed on and extends radially outward from the sleeve 18 and preferably consists of two separable sections, as illustrated in Fig. 2. A nose 30 on the pawl 27 fits into a notch 31 formed in a plunger 32 which is slidably mounted in the tube 29 and is maintained in and returned to its normal position by means of a coil spring 33 or equivalent device. The outer end of the plunger 32 is connected with an operating member shown in the form of a cup-shaped head 34, projecting over the tube 29 in slidable engagement therewith, as illustrated in Fig. 2. With the arrangement set forth, the spring 33, by acting upon the plunger 32 will normally maintain the locking pawl 27 in locking engagement with the recess 28 and thereby couple the sleeve 18 to the collar 22 so that any rotative movement of the steering wheel 24 will be communicated to the sleeve 18; when it is desired to operate the steering wheel 24 independently of the sleeve 18, for instance at such times when it is not desired to actuate the headlights, the operating member 34 is pressed inwardly to thereby shift the plunger 32 against the tension of the spring 33 in a direction to swing the pawl 27 out of the recess 28; any suitable means may be provided for maintaining the pawl 27 in its inoperative position or the manual pressure upon the member 34 may alone be relied upon for this purpose.

Tubes 35 and 36 of copper, brass or other suitable material lead from opposite ends of the control cylinder 10 to opposite ends respectively of an operating cylinder 37 fixed by means of a bracket 38 upon a suitable support such as the customary cross-bar 39 which generally extends across an automobile at the front thereof. The cylinder 37 contains a reciprocating double ended actuating piston 40 connected in any convenient manner, as by a pin 41, with the forked end of an arm 42 secured to an upright shaft 43 rotatably mounted in a hollow extension 44 forming part of the cylinder 39, to permit ready access to the interior of the cylinder 39 and its extension 44, the upper wall of these elements at least in part is made in the form of a cover 45 removably secured in place by means of bolts or the like 46. The upright shaft 43 carries a lever 47 connected by means of a link 48 with a lever 47$^a$ fixed upon a co-operating upright shaft 43$^a$ rotatably mounted in a bearing 44$^a$ which is fixed by means of a bracket 38$^a$ upon the cross-bar 39 or equivalent support. The two upright shafts 43 and 43$^a$ carry the headlights 49 which may be of any conventional type arranged upon the vehicle in the usual manner; if the arrangement includes only one headlight 49, the levers 47 and 47$^a$, and the link 48 will be omitted from the construction.

As shown in Fig. 5 channels 35$^a$ and 36$^a$ lead from the tubes 35 and 36 to the interior of the cylinder 37 at opposite ends thereof, and in the preferred arrangement are connected with each other by means of a by-pass passage 50 formed in the cylinder casing; for the purpose of controlling this by-pass 50 to open and close the by-pass connection between the channels 35$^a$ and 36$^a$ at will, a cock or valve 51 is located in said passage 50 as illustrated in Figs. 5 and 6. In order to make the passage 50 accessible throughout its length, the opposite ends thereof may be closed by removable closures in the form of bolts 52. In the preferred form of the device the opposite ends of the cylinder 37 are provided with removable screwthreaded plugs 53 having threaded axial bores 54 in which adjusting screws 55 are threaded and fixed in adjusted positions by means of lock nuts 56 as shown in Fig. 5, for the purpose to be more fully set forth hereinafter.

In practice a suitable substantially non-compressible fluid is contained in the chambers $a$ and $b$ of the control cylinder 10, the tubes 35 and 36, channels 35$^a$ and 36$^a$, and the chambers $a'$ and $b'$ of the operating cylinder 37, and also in the by-pass passage 50; in the latter the cock 51 or its equivalent normally occupies a closed position so that ordinarily no communication between the channels 35$^a$ and 36$^a$ exists through said passage. At the same time the locking pawl 27 is positioned in the recess 26, so that the collar 22 with the steering wheel 24 is coupled to the sleeve 18.

With the described arrangement two fluid columns are provided, one upon each side of the pistons 13 and 40, or in other words between the opposed ends of said pistons 13 and 40. As the steering wheel 24 is operated to change the direction of travel of the vehicle, the sleeve 18 and its helical cam groove or grooves 17 will be correspondingly rotated upon the post 12 and accordingly will cause the operating member 15 to be moved lengthwise in one direction or the other dependent upon the direction in which the steering wheel 24 is rotated. This movement of the member 15 will correspondingly move the piston 13 in the cylinder 10 and accordingly will displace the aforesaid fluid columns which, as a result of this displacement, bring about a movement of the piston 40 in the operating cylinder 37. The movement of the piston 40 is transmitted to the arm 42 and causes the latter to rotate the upright shaft 43 on its axis, and by means of the levers 47 and 47$^a$ and link 48 brings about a coincidental and corresponding rotation of the upright shaft 43$^a$. As a result of this movement of the shafts 43 and 43$^a$, the headlights 49 are pivotally swung about the axes of said shafts in a manner to project the light beams in the direction in which the vehicle is being steered; it will be understood that the arrangement is such that the movements of the headlights 49 are always in accord with the movements of the steering wheel 24 as long as the device is operatively connected therewith. If at any time, as for instance during travel in daylight, it is desired to maintain the headlights fixed in their normal, straight ahead position, the device may be disconnected from the steering wheel 24 by adjusting the locking pawl 27 out of the notch 26 and temporarily fixing said pawl in its inoperative position. Or the device may be rendered inoperative by setting the cock 51 or its equivalent in a position to open the by-pass passage 50 and thereby establish a by-pass connection between the channels 35$^a$ and 36$^a$ and accordingly between the tubes 35 and 36. In this adjustment the fluid in the columns will simply reciprocate in the tubes 35, 36, the channels 35$^a$, 36$^a$ and the by-pass passage 50, as the steering wheel 24 is actuated, without having any effect on the piston 40. The opening of the by-pass connection 50 between the channels 35$^a$ and 36$^a$ and consequently between the chambers $a'$ and $b'$ of the cylinder 37 serves also to restore the pressure or fluid balance upon opposite sides of the pistons, if this pressure or fluid balance is disturbed from any cause. Differences in pressure upon opposite sides of the pistons may also be equalized by adjusting the screws 55 in the bores 54.

The construction comprises a hydraulic means which is of maximum simplicity and at the same time is extremely sensitive and operates in positive synchronism and in accordance with the steering wheel. The light beams from the headlights thus always directly illuminate the path of travel in advance of the vehicle regardless of any changes in the direction of travel. In addition, the arrangement is easily adapted for use in all self-propelled vehicles regardless of the character thereof or the distance between the headlights of any given pair.

While the invention has been shown and described in connection with automobiles for which it is particularly adapted, it will be obvious that it may be used with equal advantage in all types of automotive vehicles, which are manually controlled with respect to steering, such as boats, aeroplanes and the like.

Various changes in the specific form shown and described may be made within the scope of the claims without departing from the spirit of the invention.

I claim:

1. In a travelling vehicle provided with steering means including a steering post, the combination of a pivotally mounted headlight, hydraulic means for pivotally swinging said headlight, actuating means rotatably mounted on said steering post and connected with said hydraulic means, locking means for releasably connecting said actuating means with said steering means whereby said headlight is pivotally operated coincidentally and in accordance with the steering means, and releasing means whereby said locking means is released to disconnect said hydraulic means from said steering means.

2. In a travelling vehicle provided with steering means, the combination of a pivotally mounted headlight, hydraulic means for pivotally swinging said headlight, locking means for connecting said hydraulic means with said steering means whereby said headlight is pivotally operated coincidentally and in accordance with the steering means, and means whereby said hydraulic means is rendered inoperative independently of the connection with said steering means.

3. In a travelling vehicle provided with steering means, the combination of a pair of pivotally mounted headlights, coupling means whereby said headlights are connected to move in unison, hydraulic means independent of said coupling means for pivotally swinging said two headlights in unison, and means connecting said hydraulic means with said steering means whereby said headlights are pivotally operated coincidentally and in accordance with the steering means.

4. In an automotive vehicle provided with a steering post and a steering wheel mounted thereon, the combination of a pair of upright headlights pivotally mounted on said vehicle to swing about vertical axes, coupling means whereby said headlights are connected to move in unison, a control cylinder fixed on said steering post, an operating cylinder fixed in proximity to said headlights, a control piston in said control cylinder, an operating piston in said operating cylinder connected with said headlights independent of said coupling means, tubes connecting opposite ends of said cylinders with each other and containing fluid columns effective upon said pistons in opposite directions and means rotatably mounted on said steering post and connected with said control piston, said means being movable with said steering wheel whereby a rotation of the latter will displace said fluid columns and actuate said operating piston to pivotally swing said headlights coincidentally and in accordance with said steering wheel.

5. In an automotive vehicle provided with a steering post and a steering wheel mounted thereon, the combination of a pair of upright headlights pivotally mounted on said vehicle to swing about vertical axes, coupling means whereby said headlights are connected to move in unison, a control cylinder fixed on said steering post, an operating cylinder fixed in proximity to said headlights, a control piston in said control cylinder, an operating piston in said operating cylinder connected with said headlights independent of said coupling means, tubes connecting opposite ends of said cylinders with each other and containing fluid columns effective upon said pistons in opposite directions, means rotatably mounted on said steering post and connected with said control piston, said means being movable with said steering wheel whereby a rotation of the latter will displace said fluid columns and actuate said operating piston to pivotally swing said headlights coincidentally and in accordance with said steering wheel, and means whereby said rotatably mounted means is capable of being disconnected from said steering wheel.

6. In an automotive vehicle provided with a steering post and a steering wheel mounted thereon, the combination of a pair of upright headlights pivotally mounted on said vehicle to swing about vertical axes, coupling means whereby said headlights are connected to move in unison, a control cylinder fixed on said steering post, an operating cylinder fixed in proximity to said headlights, a control piston in said control cylinder, an operating piston in said operating cylinder connected with said headlights, tubes connecting opposite ends of said cylinders with each other and containing fluid columns effective upon said pistons in opposite directions, a sleeve rotatably mounted on said steering post and provided with a helical cam groove, means whereby said sleeve is connected with said steering wheel, and an operating member controlled by said helical cam groove and connected with said control piston whereby rotation of said steering wheel will operate said control piston to displace said fluid columns and actuate said operating piston to pivotally swing said headlights coincidentally and in accordance with the steering wheel.

7. In an automotive vehicle provided with a steering post and a steering wheel mounted thereon, the combination of a pair of upright headlights pivotally mounted on said vehicle to swing about vertical axes, coupling means whereby said headlights are connected to move in unison, a control cylinder fixed on said steering post, an operating cylinder fixed in proximity to said headlights, a control piston in said control cylinder, an operating piston in said operating cylinder connected with said headlights, tubes connecting opposite ends of said cylinders with each other and containing fluid columns effective upon said pistons in opposite directions, a collar connected to move in unison with said steering wheel and provided with a recess, a sleeve rotatively mounted on said steering post in surface engagement with said collar and provided with a helical cam groove, a locking pawl carried by said sleeve and adapted to enter the recess of said collar for connecting said sleeve with said steering wheel, and an operating member controlled by said helical cam groove and connected with said control piston whereby rotation of the steering wheel will operate the control piston to displace said fluid columns and actuate said operating piston to pivotally swing said headlights coincidentally and in accordance with said steering wheel.

8. In an automotive vehicle provided with a steering post and a steering wheel mounted thereon, the combination of a pair of upright headlights pivotally mounted on said vehicle to swing about vertical axes, coupling means whereby said headlights are connected to move in unison, a control cylinder fixed on said steering post, an operating cylinder fixed in proximity to said headlights, a control piston in said control cylinder, an operating piston in said operating cylinder connected with said headlights, tubes connecting opposite ends of said cylinders with each other and containing fluid columns effective upon said pistons in opposite directions, a collar connected to move in unison with said steering wheel and provided with a recess, a sleeve rotatively mounted on said steering post in surface engagement with said collar and provided with a helical cam groove, a locking pawl carried by said sleeve and adapted to enter the recess of said collar for connecting said sleeve with said steering wheel, and an operating member controlled by said helical cam groove and connected with said control piston whereby rotation of the steering wheel will operate the control piston to displace said fluid columns and actuate said operating piston to pivotally swing said headlights coincidentally and in accordance with said steering wheel, and a plunger mounted on said sleeve and connected with said pawl for adjusting the latter out of said recess to disconnect said sleeve from said steering wheel.

9. In an automotive vehicle provided with a steering wheel, the combination of a pair of headlights pivotally mounted on said vehicle and connected to move in unison, hydraulic means connected with said steering wheel and including an operating cylinder and an operating piston connected with said headlights whereby the latter are pivotally adjusted coincidentally and in accordance with said steering wheel, and controlled means whereby the fluid may be conducted at will from one end of said cylinder to the other upon opposite sides of said piston to maintain the hydraulic balance in said cylinder without withdrawing any of the fluid from the hydraulic means.

10. In an automotive vehicle provided with a steering wheel, the combination of a pair of headlights pivotally mounted on said vehicle and connected to move in unison, hydraulic means connected with said steering wheel and including an operating cylinder and an operating piston connected with said headlights whereby the latter are pivotally adjusted coincidentally and in accordance with said steering wheel, and means whereby the hydraulic operative forces are diverted from said cylinder and from the piston therein.

11. In an automotive vehicle provided with a steering post and a steering wheel mounted thereon, the combination of a pair of upright headlights pivotally mounted on said vehicle to swing about vertical axes, coupling means whereby said headlights are connected to move in unison, a control cylinder fixed on said steering post, an operating cylinder fixed in proximity to said headlights, a control piston in said control cylinder, an operating piston in said operating cylinder connected with said headlights, tubes connecting opposite ends of said cylinders with each other and containing fluid columns effective upon said pistons in opposite directions and means connecting said control piston with said steering wheel whereby a rotation of the latter will displace said fluid columns and actuate said operating piston to pivotally swing said headlights coincidentally and in accordance with said steering wheel, said operating cylinder being provided with a by-pass passage connecting said tubes externally thereof for diverting the operative effect of said fluid columns from the operating piston.

12. In an automotive vehicle provided with a steering post and a steering wheel mounted thereon, the combination of a pair of upright headlights pivotally mounted on said vehicle to swing about vertical axes, coupling means whereby said headlights are connected to move in unison, a control cylinder fixed on said steering post, an operating cylinder fixed in proximity to said headlights, a control piston in said control cylinder, an operating piston in said operating cylinder connected with said headlights, tubes connecting opposite ends of said cylinders with each other and containing fluid columns effective upon said pistons in opposite directions, and means connecting said control piston with said steering wheel whereby a rotation of the latter will displace said fluid columns and actuate said operating piston to pivotally swing said headlights coincidentally and in accordance with said steering wheel, said operating cylinder being provided with a by-pass passage connecting said tubes externally thereof for diverting the operative effect of said fluid columns from the operating piston, and a controlling device in said by-pass passage for opening and closing the connection between said tubes through said passage.

In testimony whereof I have hereunto set my hand.

BERNARD BERGMAN.